(12) United States Patent
Wada

(10) Patent No.: US 12,097,879 B2
(45) Date of Patent: Sep. 24, 2024

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Koichiro Wada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 364 days.

(21) Appl. No.: 17/680,415

(22) Filed: Feb. 25, 2022

(65) Prior Publication Data

US 2022/0315053 A1 Oct. 6, 2022

(30) Foreign Application Priority Data

Mar. 30, 2021 (JP) .................................. 2021-058072

(51) Int. Cl.
*B60W 60/00* (2020.01)
*B60W 10/20* (2006.01)
(Continued)

(52) U.S. Cl.
CPC ........ *B60W 60/0015* (2020.02); *B60W 10/20* (2013.01); *B60W 30/12* (2013.01);
(Continued)

(58) Field of Classification Search
CPC ......... B60W 10/20; B60W 2040/0818; B60W 2420/403; B60W 2420/408; B60W 2540/223; B60W 2552/05; B60W 2552/10; B60W 2554/4041; B60W 2554/4044; B60W 2554/80; B60W 2554/801;
(Continued)

(56) References Cited

U.S. PATENT DOCUMENTS 11,390,278 B2 * 7/2022 Mahajan ................ B60W 40/04
11,465,646 B2 * 10/2022 Oyama ................. B60W 40/06
(Continued)

FOREIGN PATENT DOCUMENTS

CN 111731289 A * 10/2020 ............ B60W 30/12
CN 107024215 B * 6/2022 ............ B60W 30/08
(Continued)

*Primary Examiner* — Babar Sarwar
(74) *Attorney, Agent, or Firm* — Amin, Turocy & Watson, LLP

(57) ABSTRACT

A vehicle control device of an embodiment recognizes that a first other lane is present at a position of a first other vehicle on the basis of a first relative distance between an own vehicle and the first other vehicle, recognizes an advancing direction of the first other lane on the basis of a first relative speed between the own vehicle and the first other vehicle, in a case where the recognized advancing direction of the first other lane is opposite to an advancing direction of an own lane, determines whether or not an adjacent lane of the own lane is an oncoming lane on the basis of at least two of the first relative distance, a second relative speed between the own vehicle and a second other vehicle, and map information including an advancing direction of a lane and the number of lanes, and in a case where it is determined that the adjacent lane is an oncoming lane, continues driving assistance or automated driving.

11 Claims, 8 Drawing Sheets

(51) Int. Cl.
*B60W 30/12* (2020.01)
*B60W 40/04* (2006.01)
*B60W 40/06* (2012.01)
*B60W 40/08* (2012.01)
*B60W 40/105* (2012.01)
*G01S 13/931* (2020.01)
*G01S 17/931* (2020.01)
*G06V 20/58* (2022.01)

(52) U.S. Cl.
CPC ............ *B60W 40/04* (2013.01); *B60W 40/06* (2013.01); *B60W 40/08* (2013.01); *B60W 40/105* (2013.01); *G01S 13/931* (2013.01); *G01S 17/931* (2020.01); *G06V 20/58* (2022.01); *B60W 2040/0818* (2013.01); *B60W 2420/403* (2013.01); *B60W 2420/408* (2024.01); *B60W 2540/223* (2020.02); *B60W 2552/05* (2020.02); *B60W 2552/10* (2020.02); *B60W 2554/4041* (2020.02); *B60W 2554/4044* (2020.02); *B60W 2554/801* (2020.02); *B60W 2554/804* (2020.02); *B60W 2556/35* (2020.02)

(58) Field of Classification Search
CPC ....... B60W 2554/804; B60W 2556/35; B60W 30/12; B60W 40/04; B60W 40/06; B60W 40/08; B60W 40/105; B60W 60/0015; B60W 60/0018; G01S 13/865; G01S 13/867; G01S 13/931; G01S 17/06; G01S 17/58; G01S 17/86; G01S 17/931; G06V 20/58

See application file for complete search history.

(56) References Cited

U.S. PATENT DOCUMENTS

| | | | | |
|---|---|---|---|---|
| 2010/0238283 | A1* | 9/2010 | Kim | G06T 7/73 348/135 |
| 2015/0360721 | A1* | 12/2015 | Matsuno | B60W 30/18163 701/1 |
| 2015/0375748 | A1* | 12/2015 | Nagase | B60W 50/0097 701/41 |
| 2017/0203770 | A1* | 7/2017 | Kondo | B60W 50/14 |
| 2018/0141570 | A1* | 5/2018 | Kimura | B60W 50/14 |
| 2018/0141588 | A1* | 5/2018 | Shimizu | B62D 15/0265 |
| 2018/0170388 | A1* | 6/2018 | Shin | B60W 60/001 |
| 2018/0174462 | A1* | 6/2018 | Um | B60W 40/12 |
| 2019/0291730 | A1* | 9/2019 | Kamiya | G06V 20/58 |
| 2019/0299988 | A1* | 10/2019 | Sato | B60W 30/165 |
| 2019/0389464 | A1* | 12/2019 | Nanri | B60W 30/18 |
| 2020/0049513 | A1* | 2/2020 | Ma | G06V 20/588 |
| 2020/0086866 | A1* | 3/2020 | Miura | B60W 40/105 |
| 2020/0262438 | A1* | 8/2020 | Bai | G08G 1/0112 |
| 2020/0269839 | A1* | 8/2020 | Sato | B60W 30/18163 |
| 2020/0384996 | A1* | 12/2020 | Mahajan | B60W 30/16 |
| 2021/0031804 | A1* | 2/2021 | Oyama | B60W 60/0025 |
| 2021/0155245 | A1* | 5/2021 | Naserian | B60W 40/12 |
| 2022/0028275 | A1* | 1/2022 | Mell | G06V 20/584 |

FOREIGN PATENT DOCUMENTS

| | | | | |
|---|---|---|---|---|
| DE | 102015015302 A1 * | 5/2016 | ............ | B60W 30/12 |
| DE | 102020123942 A1 * | 6/2021 | ...... | B60W 30/18054 |
| JP | 2014-089691 | 5/2014 | | |
| WO | 2018/012179 | 1/2018 | | |
| WO | WO-2018012179 A1 * | 1/2018 | ............ | B60W 30/10 |

* cited by examiner

FIG. 2

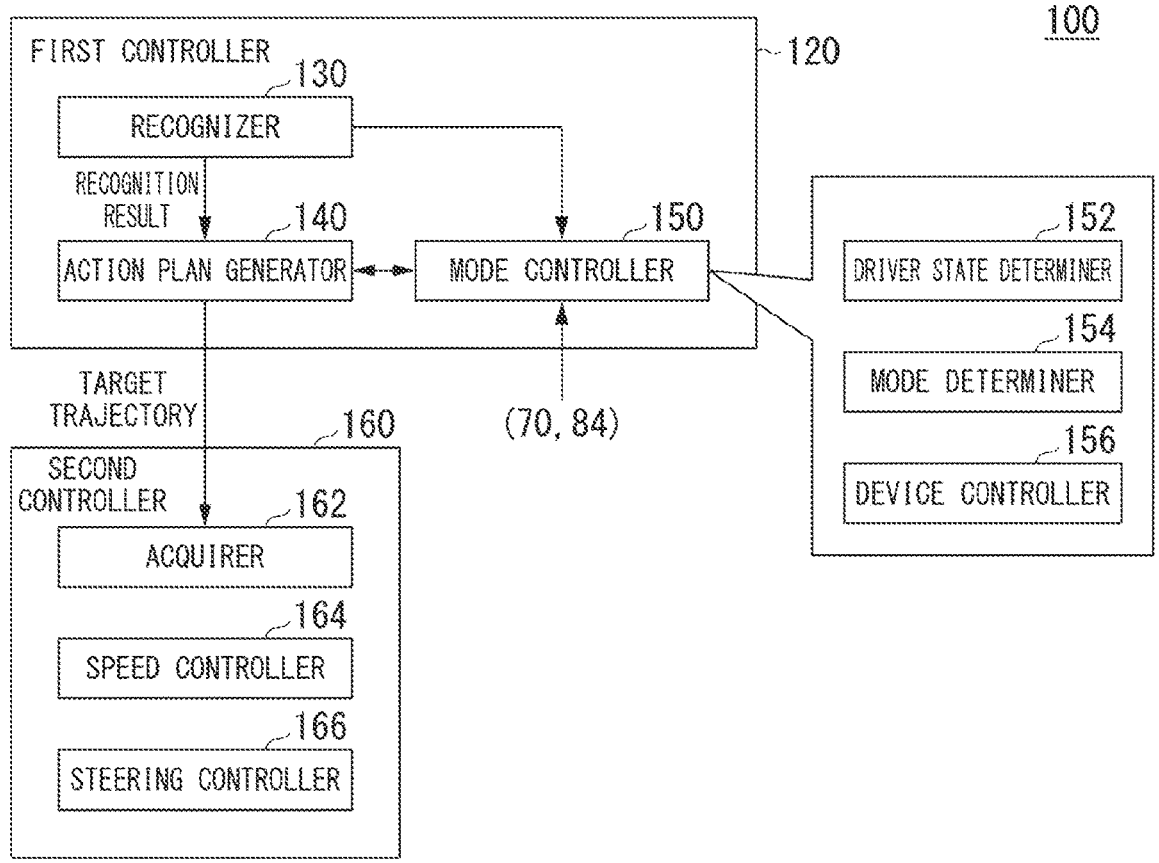

FIG. 3

| DRIVING MODE | CONTROL STATE | TASK |
|---|---|---|
| MODE A | AUTOMATED DRIVING | FRONT MONITORING: UNNECESSARY<br>STEERING GRIPPING: UNNECESSARY |
| MODE B | DRIVING ASSISTANCE | FRONT MONITORING: NECESSARY<br>STEERING GRIPPING: UNNECESSARY |
| MODE C | DRIVING ASSISTANCE | FRONT MONITORING: NECESSARY<br>STEERING GRIPPING: NECESSARY |
| MODE D | DRIVING ASSISTANCE | FRONT MONITORING: NECESSARY<br>AT LEAST CERTAIN DEGREE OF<br>DRIVING OPERATION IS NECESSARY |
| MODE E | MANUAL DRIVING | FRONT MONITORING: NECESSARY<br>BOTH STEERING AND<br>ACCELERATION/DECELERATION<br>REQUIRE DRIVING OPERATIONS |

TASK: LIGHT ↑
TASK: HEAVY ↓

VEHICLE CONTROL DEVICE, VEHICLE CONTROL METHOD, AND STORAGE MEDIUM

CROSS-REFERENCE TO RELATED APPLICATION

This application is based upon and claims the benefit of priority from Japanese Patent Application No. 2021-058072, filed Mar. 30, 2021, the entire contents of which is incorporated herein by reference.

BACKGROUND

Field of the Invention

The present invention relates to a vehicle control device, a vehicle control method, and a storage medium.

Description of Related Art

There is a technique in which, when "a lane marking has been detected" state transitions to "a lane marking has not been not detected" state, a virtual lane marking is estimated on the basis of the position of the lane marking detected in the past, and traveling of an own vehicle is controlled on the basis of the virtual lane marking (refer to, for example, PCT International Publication No. WO 2018/012179). In addition, there is a technique in which the time it will take an own vehicle to approach the side of another vehicle on a road is estimated. While estimating the time, the lateral distance that the own vehicle is required to maintain with respect to the other vehicle is determined, and the vehicle is controlled on the basis of the lateral distance (refer to, for example, Japanese Unexamined Patent Application, First Publication No. 2014-089691).

SUMMARY

However, in the technique of the related art, in a case where the lane marking cannot be recognized, a relative position in a lane in which the own vehicle is present or is traveling (hereinafter, referred to as an own lane) may not be specified, and partial driving assistance or automated driving may not be continued.

One aspect of the present invention has been made in consideration of such circumstances, and an object thereof is to provide a vehicle control device, a vehicle control method, and a storage medium capable of continuing driving assistance or automated driving for a longer period of time.

A vehicle control device, a vehicle control method, and a storage medium according to the present invention have the following configurations.

According to one aspect (1) of the present invention, there is provided a vehicle control device including a recognizer that recognizes a relative speed and a relative distance between another vehicle present in the surroundings of an own vehicle and the own vehicle; and a driving controller that performs driving assistance or automated driving for controlling at least one of a speed or steering of the own vehicle on the basis of a recognition result from the recognizer, in which the recognizer recognizes that a first other lane is present at a position of a first other vehicle on the basis of a first relative distance between the own vehicle and the first other vehicle with respect to a vehicle width direction of the own vehicle and recognizes the advancing direction of the first other lane on the basis of a first relative speed between the own vehicle and the first other vehicle with respect to an advancing direction of the own vehicle, and in which the driving controller, in a case where the advancing direction of the first other lane recognized by the recognizer is opposite to the advancing direction of the own lane, determines whether or not an adjacent lane of the own lane is an oncoming lane on the basis of at least two of the first relative distance, a second relative speed between the own vehicle and a second other vehicle with respect to the advancing direction of the own vehicle, and map information including an advancing direction of a lane and the number of lanes, and in a case where it is determined that the adjacent lane is not an oncoming lane, continues the driving assistance or the automated driving.

According to an aspect (2), in the vehicle control device of the above aspect (1), in a case where the number of lanes of an oncoming lane is N which is a natural number, the first relative distance is twice or more a predetermined width, and an N-th relative distance between the own vehicle and an N-th other vehicle with respect to the vehicle width direction of the own vehicle is (N+1) times or more the predetermined width, the driving controller determines that the adjacent lane is not an oncoming lane.

According to an aspect (3), in the vehicle control device of the above aspect (2), in a case where N is 1, and the first relative distance is twice or more the predetermined width, the driving controller determines that the adjacent lane is not an oncoming lane. According to an aspect (4), in the vehicle control device of the above aspect (2) or (3), the recognizer, in a case where N is 2 or greater, recognizes that an N-th other lane is present at a position of the N-th other vehicle on the basis of the N-th relative distance, and recognizes the advancing direction of the N-th other lane on the basis of an N-th relative speed between the own vehicle and the N-th other vehicle with respect to the advancing direction of the own vehicle, and, in a case where the first relative distance is twice or more the predetermined width, the advancing direction of the N-th other lane is opposite to the advancing direction of the own lane, and the N-th relative distance is (N+1) times or more the predetermined width, the driving controller determines that the adjacent lane is not an oncoming lane.

According to an aspect (5), in the vehicle control device of any one of the above aspects (1) to (4), the recognizer recognizes that a second other lane is present at a position of the second other vehicle on the basis of a second relative distance between the own vehicle and the second other vehicle with respect to the vehicle width direction of the own vehicle, and recognizes an advancing direction of the second other lane on the basis of the second relative speed, and, in a case where the first relative distance is twice or more a predetermined width, the advancing direction of the second other lane is the same as the advancing direction of the own lane, and the second relative distance is 1 time or more the predetermined width, the driving controller determines that the adjacent lane is not an oncoming lane.

According to an aspect (6), in the vehicle control device of any one of the above aspects (2) to (5), the recognizer further recognizes a roadside object in the surroundings of the own vehicle, and, in a case where the number of lanes of the same direction lane as the advancing direction of the own lane is two or more, the roadside object is present on a side opposite to the first other vehicle when viewed from the own vehicle, and a relative distance between the own vehicle and the roadside object with respect to the vehicle width direction of the own vehicle is less than 1 time the predetermined width, the driving controller determines that the adjacent lane is not an oncoming lane.

According to an aspect (7), in the vehicle control device of any one of the above aspects (2) to (6), the driving controller changes the predetermined width according to the type of road.

According to an aspect (8), in the vehicle control device of any one of the above aspects (1) to (7), in a case where it is determined that the adjacent lane is not an oncoming lane, the driving controller continues the driving assistance or the automated driving on condition that a driver of the own vehicle is touching a steering operator with his/her hand.

According to an aspect (9), in the vehicle control device of any one of the above aspects (1) to (8), in a case where it is determined that the adjacent lane is an oncoming lane, the driving controller reduces a level of the driving assistance or the automated driving.

According to another aspect (10) of the present invention, there is provided a vehicle control method of causing a computer mounted an own vehicle to recognize a relative speed and a relative distance between another vehicle present in the surroundings of the own vehicle and the own vehicle; perform driving assistance or automated driving for controlling at least one of a speed or steering of the own vehicle on the basis of the recognized relative speed and relative distance; recognize that a first other lane is present at a position of a first other vehicle on the basis of a first relative distance between the own vehicle and the first other vehicle with respect to a vehicle width direction of the own vehicle; recognize an advancing direction of the first other lane on the basis of a first relative speed between the own vehicle and the first other vehicle with respect to an advancing direction of the own vehicle; in a case where the recognized advancing direction of the first other lane is opposite to the advancing direction of the own lane, determine whether or not an adjacent lane of the own lane is an oncoming lane on the basis of at least two of the first relative distance, a second relative speed between the own vehicle and a second other vehicle with respect to the advancing direction of the own vehicle, and map information including an advancing direction of a lane and the number of lanes; and in a case where it is determined that the adjacent lane is not an oncoming lane, continue the driving assistance or the automated driving.

According to still another aspect (11) of the present invention, there is provided a non-transitory storage medium storing computer-readable instructions for causing a computer mounted on an own vehicle to execute recognizing a relative speed and a relative distance between another vehicle present in the surroundings of the own vehicle and the own vehicle; performing driving assistance or automated driving for controlling at least one of a speed or steering of the own vehicle on the basis of the recognized relative speed and relative distance; recognizing that a first other lane is present at a position of a first other vehicle on the basis of a first relative distance between the own vehicle and the first other vehicle with respect to a vehicle width direction of the own vehicle; recognizing an advancing direction of the first other lane on the basis of a first relative speed between the own vehicle and the first other vehicle with respect to an advancing direction of the own vehicle; in a case where the recognized advancing direction of the first other lane is opposite to the advancing direction of the own lane, determining whether or not an adjacent lane of the own lane is an oncoming lane on the basis of at least two of the first relative distance, a second relative speed between the own vehicle and a second other vehicle with respect to the advancing direction of the own vehicle, and map information including an advancing direction of a lane and the number of lanes; and in a case where it is determined that the adjacent lane is not an oncoming lane, continuing the driving assistance or the automated driving.

According to any of the above aspects, driving assistance or automated driving can be continued for a longer period of time.

BRIEF DESCRIPTION OF THE DRAWINGS

FIG. 2 is a functional configuration diagram of a first controller and a second controller.

FIG. 3 is a diagram showing an example of a correspondence relationship between a driving mode, a control state of an own vehicle, and a task.

DESCRIPTION OF EMBODIMENTS

Figure 1:
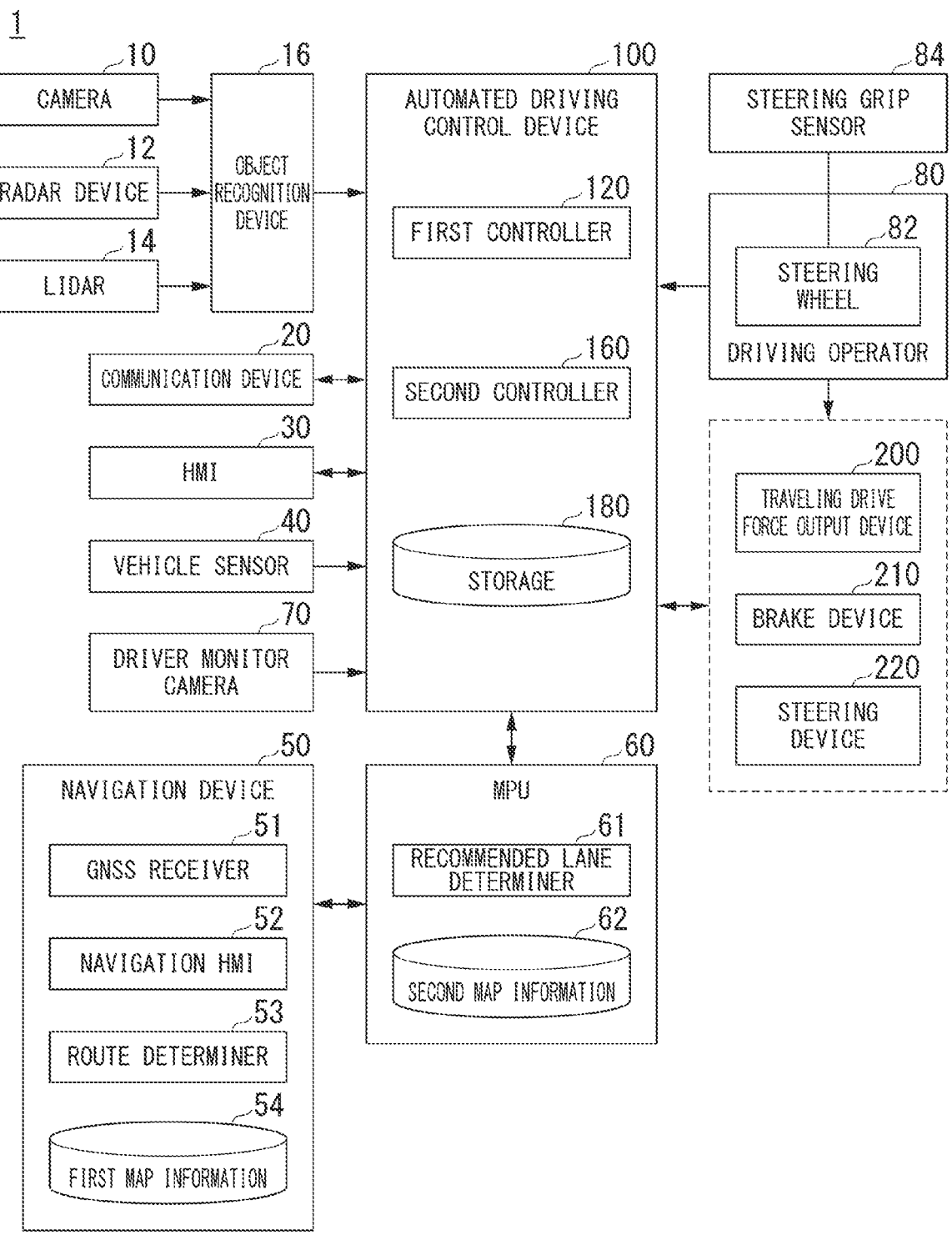
FIG. 1 is a configuration diagram of a vehicle system using a vehicle control device according to an embodiment.

Hereinafter, embodiments of a vehicle control device, a vehicle control method, and a storage medium of the present invention will be described with reference to the drawings.
Overall Configuration FIG. 1 is a configuration diagram of a vehicle system 1 using a vehicle control device according to an embodiment. A vehicle (hereinafter, an own vehicle M) having the vehicle system 1 mounted therein is, for example, a two-wheeled, three-wheeled, or four-wheeled vehicle, and a drive source thereof is an internal combustion engine such as a diesel engine or a gasoline engine, a motor, or a combination thereof. The motor is operated by using power generated by a generator connected to the internal combustion engine or power released from a secondary battery or a fuel cell.

The vehicle system 1 includes, for example, a camera 10, a radar device 12, light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, an automated driving control device 100, a traveling drive force output device 200, a brake device 210, and a steering device 220. The devices and the apparatuses are connected to each other via a multiplex communication line such as a Controller Area Network (CAN) communication line, a serial communication line, or a wireless communication network. The configuration shown in FIG. 1 is only an example, and some of the constituents may be omitted, and other constituents may be added. The automated driving control device 100 is an example of a "vehicle control device".

The camera 10 is a digital camera using a solid-state imaging element such as a charge coupled device (CCD) or a complementary metal oxide semiconductor (CMOS). The camera 10 is attached at any location in a vehicle (hereinafter, an own vehicle M) in which the vehicle system 1 is mounted. For example, in a case of imaging the front in the own vehicle M, the camera 10 is attached to the upper part of a front windshield, the back surface of a rearview mirror, or the like. In a case of imaging the rear of the own vehicle M, the camera 10 is attached to the upper part of a rear windshield or the like. In a case of imaging the right side or the left side of the own vehicle M, the camera 10 is attached to a vehicle body or a right side surface or a left side surface of a door mirror. The camera 10 periodically and repeatedly captures images of the periphery of the own vehicle M. The camera 10 may be a stereo camera.

The radar device 12 radiates electric waves such as millimeter waves in the surroundings of the own vehicle M, detects electric waves (reflected waves) reflected by an object, and thus detects at least a position of (a distance to and an azimuth of) the object. The radar device 12 is attached at any location in the own vehicle M. The radar device 12 may detect a position and a speed of an object according to a frequency modulated continuous wave (FM-CW) method.

The LIDAR 14 applies light (or an electromagnetic wave with a wavelength close to that of the light) in the surroundings of the own vehicle M, and measures scattered light. The LIDAR 14 detects a distance to a target on the basis of a time from light emission to light reception. The applied light is, for example, pulsed laser light. The LIDAR 14 is attached at any location in the own vehicle M.

The object recognition device 16 performs a sensor fusion process on detection results from some or all of the camera 10, the radar device 12, and the LIDAR 14, and thus recognizes a position, the type (attribute), a speed, and the like of an object. The object recognition device 16 outputs a recognition result to the automated driving control device 100. The object recognition device 16 may output detection results from the camera 10, the radar device 12, and the LIDAR 14 to the automated driving control device 100 without change. The object recognition device 16 may be omitted from the vehicle system 1.

The communication device 20 performs communication with another vehicle present in the surroundings of the own vehicle M, or performs communication with various server apparatuses via a wireless base station by using, for example, a cellular network, a Wi-Fi network, Bluetooth (registered trademark), or dedicated short range communication (DSRC).

The HMI 30 presents various types of information to an occupant (including a driver) of the own vehicle M and also receives an input operation from the occupant. For example, the HMI 30 may include a display device, a switch, a speaker, a buzzer, a touch panel, and the like. For example, the occupant inputs a destination of the own vehicle M to the HMI 30. The HMI 30 is an example of an "outputter".

The vehicle sensor 40 includes a vehicle speed sensor that detects a speed of the own vehicle M, an acceleration sensor that detects acceleration, a gyro sensor that detects angular velocity, an azimuth sensor that detects an orientation of the own vehicle M, and the like. The gyro sensor may include, for example, a yaw rate sensor that detects an angular velocity about a vertical axis.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory.

The GNSS receiver 51 receives electric waves from each of a plurality of GNSS satellites (artificial satellites) and specifies a position of the own vehicle M on the basis of signals of the received electric waves. The GNSS receiver 51 outputs the specified position of the own vehicle M to the route determiner 53, or outputs the position directly to the automated driving control device 100 or indirectly via the MPU 60. A position of the own vehicle M may be specified or complemented by an inertial navigation system (INS) using an output from the vehicle sensor 40.

The navigation HMI 52 includes a display device, a speaker, a touch panel, keys, and the like. The navigation HMI 52 may be partially or entirely integrated into the HMI 30 described above. For example, an occupant may enter a destination of the own vehicle M to the navigation HMI 52 instead of or in addition to inputting the destination of the own vehicle M to the HMI 30.

The route determiner 53 determines, for example, a route (hereinafter, a route on a map) from a position of the own vehicle M specified by the GNSS receiver 51 (or any entered position) to a destination that is entered by an occupant by using the HMI 30 or the navigation HMI 52 on the basis of the first map information 54.

The first map information 54 is, for example, information in which a road shape is expressed by a link indicating a road and nodes connected to each other via the link. The first map information 54 may include a curvature of a road, point of interest (POI) information, and the like. The route on the map is output to MPU 60.

The navigation device 50 may perform route guidance using the navigation HMI 52 on the basis of the route on the map. The navigation device 50 may be implemented, for example, by a function of a terminal apparatus such as a smartphone or a tablet terminal carried by the occupant. The navigation device 50 may transmit the current position and the destination to a navigation server via the communication device 20 and may acquire a route equivalent to the route on the map from the navigation server.

The MPU 60 includes, for example, a recommended lane determiner 61, and stores second map information 62 in a storage device such as an HDD or a flash memory. The recommended lane determiner 61 is realized by a hardware processor such as a central processing unit (CPU) executing a program (software). The recommended lane determiner 61 may be realized by hardware (a circuit portion; including circuitry) such as a large-scale integration (LSI), an application specific integrated circuit (ASIC), a field-programmable gate array (FPGA), or a graphics processing unit (GPU), and may be realized by software and hardware in cooperation. The program may be stored in advance in a storage device (a storage device provided with a non-transitory storage medium) of the MPU 60 and may be stored in an attachable and detachable storage medium such as a DVD or a CD-ROM and may be installed in the storage device of the MPU 60 when the storage medium (non-transitory storage medium) is attached to a drive device.

The recommended lane determiner 61 divides the route on the map provided from the navigation device 50 into a plurality of blocks (for example, divides the route on the map every 100 m in a vehicle advancing direction), and determines a recommended lane for each block by referring to the second map information 62. The recommended lane determiner 61 determines in which lane from the left the own vehicle will travel.

In a case where there is a branch location on the route on the map, the recommended lane determiner 61 determines a recommended lane such that the own vehicle M can travel on a reasonable route to advance to a branch destination.

The second map information 62 is map information with higher accuracy than the first map information 54. The second map information 62 includes various types of information such as the number of lanes on a road, an advancing direction of each lane, and the center or a boundary of each lane. The second map information 62 may include road information, traffic regulation information, address information (address/postal code), facility information, telephone number information, and the like. The second map information 62 may be updated at any time by the communication device 20 performing communication with other devices. The second map information 62 is an example of "map information".

The driver monitor camera 70 is, for example, a digital camera that uses a solid-state imaging sensor such as a CCD or a CMOS. The driver monitor camera 70 is attached to any position in the own vehicle M at a position and an orientation in which an occupant (that is, a driver) seated on a driver's seat of the own vehicle M can be imaged from the front. For example, the driver monitor camera 70 is attached to an instrument panel of the own vehicle M.

The driving operator 80 includes, for example, an accelerator pedal, a brake pedal, a shift lever, and other operators in addition to a steering wheel 82. A sensor that detects an amount of operation or the presence or absence of operation is attached to the driving operator 80. A detection result from the sensor is output to the automated driving control device 100 or is output to some or all of the traveling drive force output device 200, the brake device 210, and the steering device 220.

The steering wheel 82 does not necessarily have to be annular and may have a form of an odd-shaped steering wheel, a joystick, a button, or the like. A steering grip sensor 84 is attached to the steering wheel 82. The steering grip sensor 84 is a capacitance sensor or the like. The steering grip sensor 84 detects whether or not the driver is gripping the steering wheel 82 (meaning that the driver is in contact with the steering wheel 82 in a state in which a force is being applied thereto) and outputs a signal indicating the detection result to the automated driving control device 100. The steering wheel 82 is an example of a "steering operator".

The automated driving control device 100 includes, for example, a first controller 120, a second controller 160, and a storage 180.

Each of the first controller 120 and the second controller 160 is realized, for example, by a hardware processor such as a CPU executing a program (software). Some or all of the constituents may be realized by hardware (a circuit portion; including circuitry) such as an LSI, an ASIC, an FPGA, or a GPU, and may be realized by software and hardware in cooperation. The program may be stored in advance in a storage device (a storage device provided with a non-transitory storage medium) such as an HDD or a flash memory of the automated driving control device 100, and may be stored in an attachable and detachable storage medium such as a DVD or a CD-ROM and may be installed in the HDD or the flash memory of the automated driving control device 100 when the storage medium (non-transitory storage medium) is attached to a drive device.

The storage 180 is implemented by, for example, an HDD, a flash memory, an EEPROM, a ROM, a RAM, or the like). The storage 180 stores, for example, a program read and executed by a processor.

FIG. 2 is a functional configuration diagram of the first controller 120 and the second controller 160. The first controller 120 includes, for example, a recognizer 130, an action plan generator 140, and a mode controller 150. A combination of the action plan generator 140 and the second controller 160, or a combination of the action plan generator 140, the mode controller 150, and the second controller 160 is an example of a "driving controller".

The first controller 120 is realized by combining, for example, a function of artificial intelligence (AI) with a function of a model provided in advance. For example, a function of "recognizing an intersection" may be realized by executing recognition of the intersection using deep learning and recognition based on conditions (for example, there are a signal that can be matched with a pattern, and a road marking) given in advance in parallel and scoring and comprehensively evaluating both of recognition results. This ensures the reliability of automated driving.

The recognizer 130 recognizes situations or environments in the surroundings of the own vehicle M. For example, the recognizer 130 recognizes an object present in the surroundings of the own vehicle M on the basis of information input from the camera 10, the radar device 12, and the LIDAR 14 via the object recognition device 16. Objects recognized by the recognizer 130 include, for example, bicycles, motorcycles, four-wheeled vehicles, pedestrians, road signs, road markings, lane markings, utility poles, guardrails, and falling objects. The recognizer 130 recognizes states of the object, such as the position, the speed, and the acceleration. The position of the object is recognized as, for example, a position (that is, a relative position with respect to the own vehicle M) in an absolute coordinate system having a representative point (for example, the centroid or the drive axis center) of the own vehicle M as an origin and is used for control. The position of the object may be represented by a representative point such as the centroid or a corner of the object and may be represented by an expressed region. The "states" of the object may include an acceleration, a jerk, or an "action state" of the object (for example, whether or not the object is changing lanes or trying to change lanes).

The recognizer 130 recognizes, for example, a lane in which the own vehicle M is present or traveling (hereinafter, an own lane) and an adjacent lane to the own lane. For example, the recognizer 130 acquires the second map information 62 from the MPU 60, compares a pattern (for example, an arrangement of solid lines and dashed lines) of road lane markings included in the obtained the second map information 62 with a pattern of road lane markings in the surroundings of the own vehicle M recognized from an image captured by the camera 10, and thus recognizes a space between the lane markings as an own lane or an adjacent lane.

The recognizer 130 is not limited to a road lane marking and may recognize a boundary representing a lane boundary (road boundary) such as a road lane marking, a road shoulder, a curb, a median strip, and a guardrail, to recognize lanes such as an own lane or an adjacent lane. In this recognition, a position of the own vehicle M acquired from the navigation device 50 or a process result from an INS may be taken into consideration. The recognizer 130 recognizes a temporary stop line, an obstacle, a red light, a tollgate, or other road events.

When the own lane is recognized, the recognizer 130 recognizes a relative position and a posture of the own vehicle M with respect to the own lane. The recognizer 130 may recognize, for example, a deviation of a reference point of the own vehicle M from the lane center and an angle formed with a line connecting coordinate points of the lane centers in an advancing direction of the own vehicle M as a relative position and a posture of the own vehicle M with respect to the own lane. Alternatively, the recognizer 130 may recognize a position or the like of the reference point of the own vehicle M with respect to either of side ends (road lane markings or road boundaries) of the own lane as the relative position of the own vehicle M with respect to the own lane.

The action plan generator 140 generates target trajectories in which the own vehicle M automatedly (regardless of an operation of a driver) travels in the future in a state during traveling defined by an event that will be described later such that the own vehicle M can travel in a recommended lane determined by the recommended lane determiner 61 in principle and can also cope with a surrounding situation of the own vehicle M.

The target trajectory includes, for example, a speed element. For example, the target trajectory is expressed by sequentially arranging locations (trajectory points) to be reached by the own vehicle M. The trajectory points are locations to be reached by the own vehicle M every predetermined traveling distance (for example, about several [m]) in terms of a distance along a road, and, separately therefrom, a target speed and a target acceleration for each predetermined sampling time (for example, any of about 0.1 to 0.9 seconds) are generated as parts of the target trajectory. A trajectory point may be a position to be reached by the own vehicle M at a sampling time point every predetermined sampling time. In this case, information regarding the target speed or the target acceleration may be expressed by an interval between trajectory points.

The action plan generator 140 may generate a target trajectory in which the own vehicle M exceptionally travels in another lane different from a recommended lane (for example, a lane adjacent to the recommended lane) in order to cope with the surrounding situation of the own vehicle M. That is, a priority of other lanes other than the recommended lane is relatively lower than a priority of the recommended lane. For example, the recommended lane has the highest priority (priority 1), another lane (hereinafter, an adjacent lane) adjacent to the recommended lane has the second highest priority (priority 2), and still another lane that is adjacent to the adjacent lane has the third highest priority (priority 3). As described above, the action plan generator 140 generates a target trajectory in which the own vehicle M travels in the recommended lane having the highest priority in principle, and generates a target trajectory in which the own vehicle M exceptionally travels in another lane having a lower priority than that of the recommended lane depending on a surrounding situation of the own vehicle M.

The action plan generator 140 determines an automated driving event (including partial driving assistance) on a route where the recommended lane is determined when generating the target trajectory. The automated driving event is information defining a behavior that the own vehicle M has to take under automated driving (partial driving assistance), that is, the state during traveling (or a mode during traveling).

The automated driving event includes, for example, a constant speed traveling event, a low speed following traveling event, a lane change event, and a passing event. The constant speed traveling event is an event in which the own vehicle M travels in the same lane at a constant speed. The low speed following traveling event is an event in which the own vehicle M follows another vehicle (hereinafter, referred to as a preceding vehicle) that is present within a predetermined distance (for example, within 100 m) in front of the own vehicle M and is closest to the own vehicle M. The "following" may be, for example, a traveling state in which a relative distance (inter-vehicle distance) between the own vehicle M and the preceding vehicle is kept constant, or a traveling state in which the own vehicle M travels in the center of the own lane in addition to keeping the relative distance between the own vehicle M and the preceding vehicle constant. The lane change event is an event in which a lane of the own vehicle M is changed from the own lane to an adjacent lane. The passing event is an event in which the own vehicle M temporarily changes a lane to an adjacent lane, passes the preceding vehicle in the adjacent lane, and then performs a lane change from the adjacent lane to the original lane again.

The automated driving event further includes a branching event, a merging event, a lane reduction event, a takeover event, and the like. The branching event is an event in which, in a case where the own vehicle M is traveling in a main lane and a destination thereof is located on an extension of a branch line (hereinafter, a branch lane) branched from the main lane, the own vehicle M is guided to change a lane from the main lane to the branch lane at a branch location. The merging event is an event in which, in a case where the own vehicle M is traveling on a branch line (hereinafter, a merging lane) which merges into a main lane and a destination thereof is located on an extension of the main lane, the own vehicle M is guided to change a lane from the merging lane to the main lane at a merging location. The lane reduction event is an event in which the own vehicle M changes a lane to another lane when traveling on a route in which the number of lanes is decreasing on the way. The takeover event is an event for finishing an automated driving mode (a mode A that will be described later) and switching to a driving assistance mode (a mode B, C, or D that will be described later) or a manual driving mode (a mode E that will be described later). For example, a lane marking may be interrupted in front of a tollhouse on an expressway, and a relative position of the own vehicle M may not be recognized. In such a case, a takeover event is determined (planned) for a section in front of the tollhouse.

The action plan generator 140 sequentially determines these plurality of events on the route to the destination, and generates a target trajectory for causing the own vehicle M to travel in a state defined by each event while considering a surrounding situation of the own vehicle M.

The mode controller 150 determines a driving mode of the own vehicle M to be one of a plurality of driving modes. The plurality of driving modes respectively have different tasks imposed on a driver. The mode controller 150 includes, for example, a driver state determiner 152, a mode determiner 154, and a device controller 156. Individual functions thereof will be described later. A combination of the driver monitor camera 70 and the driver state determiner 152 is an example of a "detector".

FIG. 3 is a diagram showing an example of a correspondence relationship between a driving mode, a control state of the own vehicle M, and a task. Driving modes of the own vehicle M include, for example, five modes from the mode A to the mode E. A control state, that is, the degree of automation (control level) of driving control for the own vehicle M is highest in the mode A, then becomes lower in the order of the mode B, the mode C, and the mode D, and is lowest in the mode E. In contrast, a task imposed on a driver is lightest in the mode A, then becomes heavier in the order of the mode B, the mode C, the mode D, and is heaviest in the mode E. In the modes D and E, the vehicle is in a control state that is not automated driving, and thus the automated driving control device 100 is responsible for finishing control related to automated driving and transitioning to driving assistance or manual driving. Hereinafter, details of each driving mode will be exemplified.

In the mode A, the automated driving state is set, and neither the forward monitoring nor the gripping of the steering wheel 82 (steering gripping in the figure) is imposed on the driver. However, even in mode A, the driver is required to be in a posture to quickly shift to manual driving in response to a request from the system centered on the automated driving control device 100. The term "automated driving" as used herein means that both steering and acceleration/deceleration are controlled without depending on the driver's operation. The front means the space in the traveling direction of the own vehicle M that is visually recognized through the front windshield. The mode A is a driving mode that is executable in a case of satisfying a condition that the own vehicle M is traveling at a predetermined speed (for example, about 50 km/h]) or less on a motorway such as an expressway and there is a preceding vehicle that is a following target and may be referred to as traffic jam pilot (TJP). In a case where this condition is no longer satisfied, the mode controller 150 changes a driving mode of the own vehicle M to the mode B.

In the mode B, the vehicle is in a driving assistance state, and the task of monitoring the front in the own vehicle M (hereinafter, front monitoring) is imposed on the driver, but the task of gripping the steering wheel 82 is not imposed on the driver. In the mode C, the vehicle is in a driving assistance state, and the task of front monitoring and the task of gripping the steering wheel 82 are imposed on the driver. The mode D is a driving mode that requires a certain degree of driving operation by the driver with respect to at least one of steering and acceleration/deceleration of the own vehicle M. For example, in the mode D, driving assistance such as adaptive cruise control (ACC) or lane keeping assist system (LKAS) is provided. In the mode E, the vehicle is in a manual operation state in which both steering and acceleration/deceleration require driving operations by the driver. In both the mode D and the mode E, the task of monitoring the front in the own vehicle M is naturally imposed on the driver.

The automated driving control device 100 (and a driving assistance device (not shown)) executes an automated lane change according to a driving mode. The automated lane change includes an automated lane change (1) according to a system request and an automated lane change (2) according to a driver request. The automated lane change (1) includes an automated lane change for passing in a case where a speed of a preceding vehicle is lower than a speed of the own vehicle by a reference or more and an automated lane change for advancing toward a destination (an automated lane change due to a change of a recommended lane). The automated lane change (2) is to change a lane of the own vehicle M toward an operation direction when the direction indicator is operated by the driver in a case where conditions related to a speed or a positional relationship with surrounding vehicles are satisfied.

The automated driving control device 100 does not execute either the automated lane change (1) or (2) in the mode A. The automated driving control device 100 executes both the automated lane change (1) and (2) in modes B and C. The driving assistance device (not shown) does not execute the automated lane change (1) but executes the automated lane change (2) in the mode D. In the mode E, neither automated lane change (1) nor (2) is executed.

FIG. 2 will be referred to again. The mode controller 150 changes a driving mode of the own vehicle M to a driving mode in which the task is heavier in a case where the task related to the determined driving mode is not executed by the driver.

For example, in the mode A, in a case where the driver is in a posture where the driver cannot transition to manual driving in response to a request from the system (for example, in a case where the driver continues to look outside a permissible area or a sign that driving becomes difficult is detected), the mode controller 150 uses the HMI 30 to prompt the driver to transition to manual driving, and if the driver does not respond, the mode controller 150 performs control of gradually bringing the own vehicle M to a road shoulder and stopping the own vehicle M to stop the automated driving. After the automated driving is stopped, the own vehicle is in the mode D or E, and the own vehicle M can be started by a manual operation of the driver. Hereinafter, the same applies to "stop automated driving". In a case where the driver is not monitoring the front in the mode B, the mode controller 150 uses the HMI 30 to prompt the driver to monitor the front, and if the driver does not respond, the mode controller 150 performs control of gradually bringing the own vehicle M to a road shoulder and stopping the own vehicle M to stop the automated driving. In the mode C, in a case where the driver is not monitoring the front or is not gripping the steering wheel 82, the mode controller 150 uses the HMI 30 to prompt the driver to monitor the front and/or grip the steering wheel 82, and if the driver does not respond, the mode controller 150 performs control of gradually bringing the own vehicle M to a road shoulder and stopping the own vehicle M to stop the automated driving.

The driver state determiner 152 determines whether or not the driver is in a state of being able to perform a task on the basis of an image from the driver monitor camera 70 and a detection signal from the steering grip sensor 84 in order to perform the above mode change.

For example, the driver state determiner 152 analyzes the image from the driver monitor camera 70 to estimate a posture of the driver and determines whether or not the driver is in a posture to be able to transition to manual driving in response to a request from the system on the basis of the estimated posture.

The driver state determiner 152 analyzes the image from the driver monitor camera 70 to estimate an orientation of the driver's line of sight or face and determines whether or not the driver is monitoring the front in the own vehicle M on the basis of the estimated orientation of the line of sight or the face.

For example, the driver state determiner 152 detects a positional relationship between the driver's head and eyes, a combination of a reference point and a moving point in the eyes, and the like from the image from the driver monitor camera 70 by using a technique such as template matching. The driver state determiner 152 estimates the orientation of the face on the basis of a relative position of the eyes with respect to the head. The driver state determiner 152 estimates the orientation of the driver's line of sight on the basis of a position of the moving point with respect to the reference point. For example, in a case where the reference point is the inner corner of the eye, the moving point is the iris. In a case where the reference point is the corneal reflex region, the moving point is the pupil.

The driver state determiner 152 analyzes the image from the driver monitor camera 70 to determine the degree of awakening of the driver. The driver state determiner 152 determines whether or not the driver is gripping the steering wheel 82 (whether or not the driver is touching the steering wheel 82 with his/her hand) on the basis of the detection signal from the steering grip sensor 84.

The mode determiner 154 determines the driving mode of the own vehicle M on the basis of a recognition result from the recognizer 130 or the determination result from the driver state determiner 152.

The device controller 156 controls an in-vehicle device such as the HMI 30 on the basis of the driving mode of the own vehicle M determined by the mode determiner 154 and the determination result from the driver state determiner 152. For example, the device controller 156 may cause the HMI 30 to output information for prompting the driver to perform a task corresponding to each driving mode.

The second controller 160 controls the traveling drive force output device 200, the brake device 210, and the steering device 220 such that the own vehicle M can pass along the target trajectory generated by the action plan generator 140 as scheduled.

The second controller 160 includes, for example, an acquirer 162, a speed controller 164, and a steering controller 166. The acquirer 162 acquires information regarding the target trajectory (trajectory point) generated by the action plan generator 140 and stores the information in a memory (not shown). The speed controller 164 controls the traveling drive force output device 200 or the brake device 210 on the basis of a speed element included in the target trajectory stored in the memory. The steering controller 166 controls the steering device 220 according to a curved state of the target trajectory stored in the memory. Processes in the speed controller 164 and the steering controller 166 are realized by a combination of, for example, feedforward control and feedback control. As an example, the steering controller 166 executes a combination of feedforward control based on a curvature of a road in front of the own vehicle M and feedback control based on deviation from the target trajectory.

The traveling drive force output device 200 outputs traveling drive force (torque) for traveling of the vehicle to drive wheels. The traveling drive force output device 200 includes, for example, a combination of an internal combustion engine, a motor, and a transmission, and an electronic control unit (ECU) controlling the constituents. The ECU controls the constituents according to information that is input from the second controller 160 or information that is input from the driving operator 80.

The brake device 210 includes, for example, a brake caliper, a cylinder that transmits hydraulic pressure to the brake caliper, an electric motor that generates the hydraulic pressure in the cylinder, and a brake ECU. The brake ECU controls the electric motor on the basis of information being input from the second controller 160 or information being input from the driving operator 80, so that brake torque corresponding to a braking operation is output to each vehicle wheel. The brake device 210 may include, as a backup, a mechanism transmitting hydraulic pressure generated by operating the brake pedal included in the driving operator 80, to the cylinder via a master cylinder. The brake device 210 is not limited to the above configuration and may be an electronic control type hydraulic brake device that controls an actuator according to information being input from the second controller 160 and thus transmits hydraulic pressure in a master cylinder to the cylinder.

The steering device 220 includes, for example, a steering ECU and an electric motor. The electric motor changes an orientation of a turning wheel by applying force to, for example, a rack-and-pinion mechanism. The steering ECU drives the electric motor on the basis of information being input from the second controller 160 or information being input from the driving operator 80, so that an orientation of the turning wheel is changed.

Overall Process Flow

Figure 4:
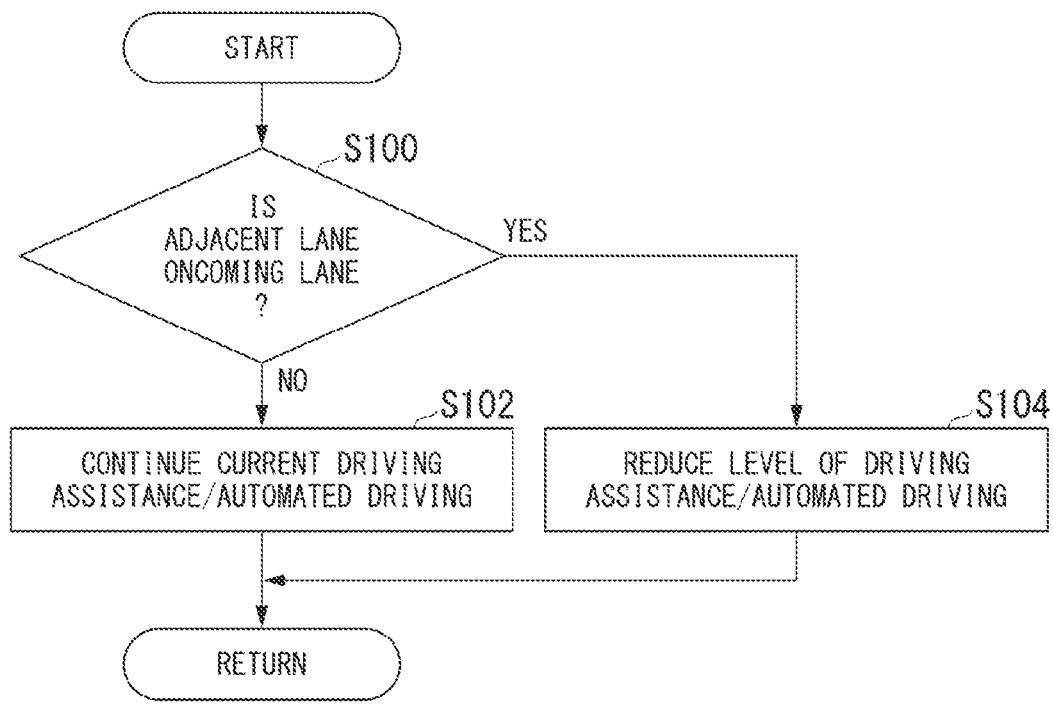
FIG. 4 is a flowchart showing an example of a flow of a series of processes by an automated driving control device of the embodiment.

Hereinafter, a flow of a series of processes in the automated driving control device 100 of the embodiment will be described with reference to a flowchart. FIG. 4 is a flowchart showing an example of a flow of a series of processes by the automated driving control device 100 of the embodiment.

The processes in this flowchart are typically executed under a driving assistance mode in which the task of gripping the steering wheel 82 is imposed on a driver, such as the mode C or D, but are not limited to this, and may be executed under other driving modes (for example, the mode A or B).

First, the mode determiner 154 determines whether or not an adjacent lane to an own lane is an oncoming lane of which an advancing direction is opposite to that of the own lane on the basis of a recognition result from the recognizer 130 (step S100).

In a case where the adjacent lane is not an oncoming lane but the same direction lane of which an advancing direction is the same as that of the own lane, the mode determiner 154 maintains the current driving mode. In response to this, the second controller 160 continues the current driving assistance or automated driving (step S102).

On the other hand, in a case where the adjacent lane is an oncoming lane, the mode determiner 154 changes the current driving mode to a driving mode with a lower control level. In response to this, the second controller 160 reduces a control level of the current driving assistance or automated driving (step S104).

For example, in a case where the current driving mode is the mode C or D, the mode determiner 154 changes the driving mode to the mode E. In this case, the traveling drive force output device 200, the brake device 210, and the steering device 220, which are control targets of the second controller 160, are operated according to information input from the driving operator 80.

Examples of scenes that own vehicle may encounter

Figure 5:
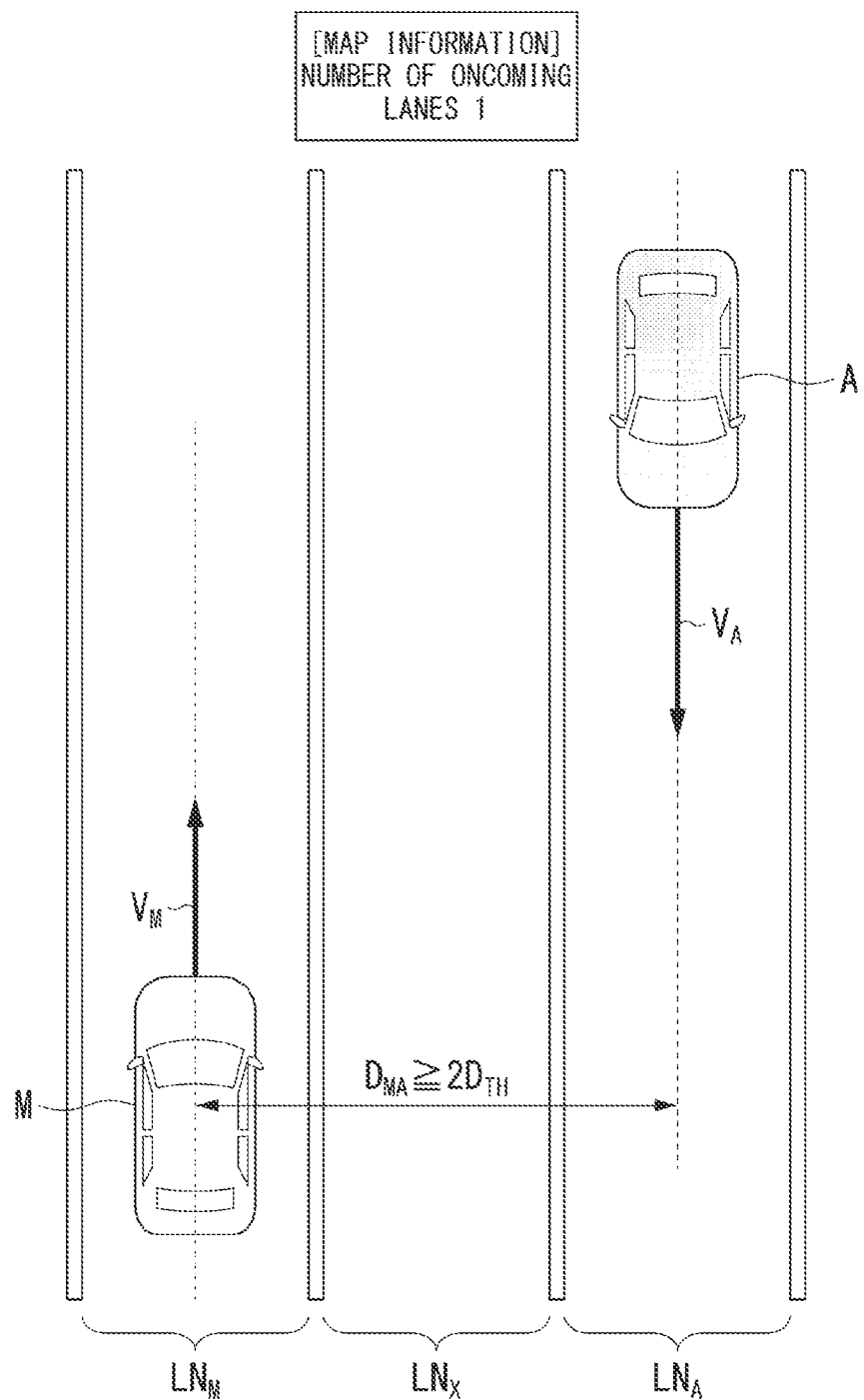
FIG. 5 is a diagram showing an example of a scene that an own vehicle may encounter.

Hereafter, some scenes that the own vehicle M may encounter will be described. FIG. 5 is a diagram showing an example of a scene that the own vehicle M may encounter. In the illustrated scene, another vehicle A is present near the own vehicle M. The other vehicle A is an example of a "first other vehicle".

For example, when the recognizer 130 recognizes that the other vehicle A is present, the recognizer 130 recognizes a speed $V_A$ of the other vehicle A. The recognizer 130 recognizes a relative speed $V_{MA}$ between the speed $V_M$ of the own vehicle M and the speed $V_A$ of the other vehicle A, and recognizes a relative distance $D_{MA}$ between the own vehicle M and the other vehicle A. As shown in the figure, the relative speed $V_{MA}$ is a relative speed (vertical relative speed) with respect to an advancing direction of the own vehicle M, and the relative distance $D_{MA}$ is a relative distance (horizontal relative distance) with respect to a vehicle width direction of the own vehicle M. The relative speed $V_{MA}$ is an example of a "first relative speed", and the relative distance $D_{MA}$ is an example of a "first relative distance".

In the illustrated example, lane markings of each lane are drawn for convenience, but the lane markings may be rubbed by weathering or may be difficult to see due to dirt or tire marks. Under such a situation that the lane marking cannot be recognized, the recognizer 130 recognizes a relative positional relationship of each lane on the basis of the relative speed $V_{MA}$, the relative distance $D_{MA}$, and/or the second map information 62 (map information including the traveling direction of each lane and the number of lanes).

For example, the recognizer 130 recognizes that an own lane $LN_M$ is present at the traveling position of the own vehicle M, and recognizes that another lane $LN_A$ is present at the traveling position of the other vehicle A. The other lane $LN_A$ is an example of a "first other lane".

Next, the recognizer 130 recognizes an advancing direction of the other lane $LN_A$ on the basis of the relative speed $V_{MA}$. For example, the recognizer 130 determines that the advancing direction of the other lane $LN_A$ is opposite to the advancing direction of the own lane $LN_M$ if the relative speed $V_{MA}$ is equal to or higher than a predetermined speed $V_{TH}$ and determines that the advancing direction of the other lane $LN_A$ is the same as the advancing direction of the own lane $LN_M$ if the relative speed $V_{MA}$ is lower than the predetermined speed $V_{TH}$.

That is, the recognizer 130 determines that the other lane $LN_A$ is an oncoming lane of the own lane $LN_M$ if the relative speed $V_{MA}$ is equal to or higher than the predetermined speed $V_{TH}$ and determines that the other lane $LN_A$ is the same direction lane of the own lane $LN_M$ if the relative speed $V_{MA}$ is lower than the predetermined speed $V_{TH}$.

Next, the recognizer 130 determines whether or not still another lane $LN_X$ is interposed between the own lane $LN_M$ and the other lane $LN_A$ on the basis of the relative distance $D_{MA}$ between the own vehicle M and the other vehicle A. For example, the recognizer 130 determines that the other lane $LN_X$ is interposed if the relative distance $D_{MA}$ is twice or more a predetermined width $D_{TH}$ and determines that the other lane $LN_X$ is not interposed if the relative distance $D_{MA}$ is less than twice the predetermined width $D_{TH}$. The predetermined width $D_{TH}$ is a general width for one lane, and may be, for example, a width of about 1.5 m to 3 m.

That is, if the relative distance $D_{MA}$ is twice or more the predetermined width $D_{TH}$, the recognizer 130 determines that the adjacent lane of the own lane $LN_M$ (adjacent lane on the other vehicle A side) is not the other lane $LN_A$ that is the oncoming lane but is the other lane $LN_X$ of which an advancing direction is unknown. If the relative distance $D_{MA}$ is lower than twice the predetermined width $D_{TH}$, the recognizer 130 determines that the adjacent lane of the own lane $LN_M$ is the other lane $LN_A$ that is the oncoming lane.

As described above, when the adjacent lane of the own lane $LN_M$ is the other lane $LN_A$ and the other lane $LN_A$ is an oncoming lane, a control level of driving assistance or automated driving is reduced.

On the other hand, if the adjacent lane of the own lane $LN_M$ is the other lane $LN_X$, the recognizer 130 further recognizes an advancing direction of the other lane $LN_X$ on the basis of the second map information 62. For example, in a case where the number of lanes N of the oncoming lane included in the second map information 62 is one (where N is any natural number), the recognizer 130 inevitably determines that the other lane $LN_X$ is the same direction lane. In the illustrated example, in a case where the relative distance $D_{MA}$ is twice or more the predetermined width $D_{TH}$ and the number of lanes N of the oncoming lane is one, the adjacent lane of the own lane $LN_M$ is not an oncoming lane, and thus a control level of driving assistance or automated driving is maintained.

Figure 6:
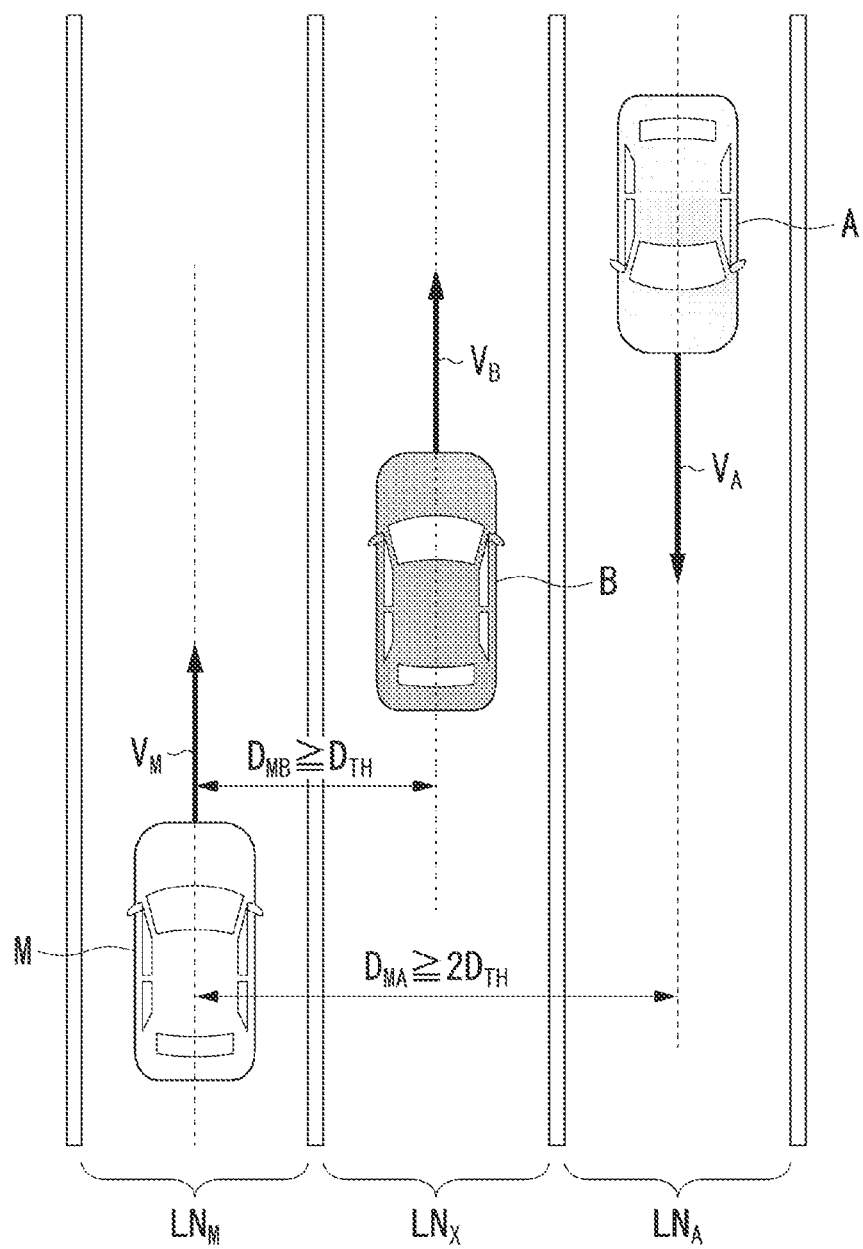
FIG. 6 is a diagram showing another example of a scene that the own vehicle may encounter.

FIG. 6 is a diagram showing another example of a scene that the own vehicle M may encounter. In the illustrated scene, there is still another vehicle B in addition to the other vehicle A. The other vehicle B is an example of a "second other vehicle".

In such a scene, the recognizer 130 recognizes that the own lane $LN_M$ is present at the traveling position of the own vehicle M, recognizes that the other lane $LN_A$ is present at the traveling position of the other vehicle A, and recognizes that another lane $LN_B$ is present at the traveling position of the other vehicle B. The other lane $LN_B$ is an example of a "second other lane".

Next, the recognizer 130 recognizes an advancing direction of the other lane $LN_A$ on the basis of the relative speed $V_{MA}$ between the own vehicle M and the other vehicle A with respect to the advancing direction of the own vehicle M, and recognizes an advancing direction of the other lane $LN_B$ on the basis of a relative speed $V_{MB}$ between the own vehicle M and the other vehicle B with respect to the advancing direction of the own vehicle M. The relative speed $V_{MB}$ is an example of a "second relative speed".

As described above, if the relative speed $V_{MA}$ is equal to or higher than the predetermined speed $V_{TH}$, the recognizer 130 determines that the advancing direction of the other lane $LN_A$ is opposite to the advancing direction of the own lane $LN_M$, and if the relative speed $V_{MA}$ is lower than the predetermined speed $V_{TH}$, determines that the advancing direction of the other lane $LN_A$ is the same as the advancing direction of the own lane $LN_M$. Similarly, if the relative speed $V_{MB}$ is equal to or higher than the predetermined speed $V_{TH}$, the recognizer 130 determines that the advancing direction of the other lane $LN_B$ is opposite to the advancing direction of the own lane $LN_M$, and if the relative speed $V_{MB}$ is lower than the predetermined speed $V_{TH}$, determines that the advancing direction of the other lane $LN_B$ is the same as the advancing direction of the own lane $LN_M$. In the illustrated example, it is determined that the advancing direction of the other lane $LN_A$ is opposite to the advancing direction of the own lane $LN_M$, that is, the other lane $LN_A$ is an oncoming lane, and it is determined that the advancing direction of the other lane $LN_B$ is same as the advancing direction of the own lane $LN_M$, that is, the other lane $LN_B$ is the same direction lane.

Next, the recognizer 130 recognizes a relative positional relationship between the own lane $LN_M$, the other lane $LN_A$, and the other lane $LN_B$ on the basis of the relative distance $D_{MA}$ between the own vehicle M and the other vehicle A with respect to the vehicle width direction of the own vehicle M, and a relative distance $D_{MB}$ between the own vehicle M and the other vehicle B with respect to the vehicle width direction of the own vehicle M. The relative distance $D_{MB}$ is an example of a "second relative distance".

For example, in a case where the relative distance $D_{MA}$ is twice or more the predetermined width $D_{TH}$ and the relative distance $D_{MB}$ is 1 time or more and less than twice the predetermined width $D_{TH}$, the recognizer 130 recognizes that the own lane $LN_M$ is adjacent to the other lane $LN_B$, and the other lane $LN_B$ is adjacent to the other lane $LN_A$. In the illustrated example, since the other lane $LN_B$, which is an adjacent lane of the own lane $LN_M$, is the same direction lane, the control level of driving assistance or automated driving is maintained.

Figure 7:
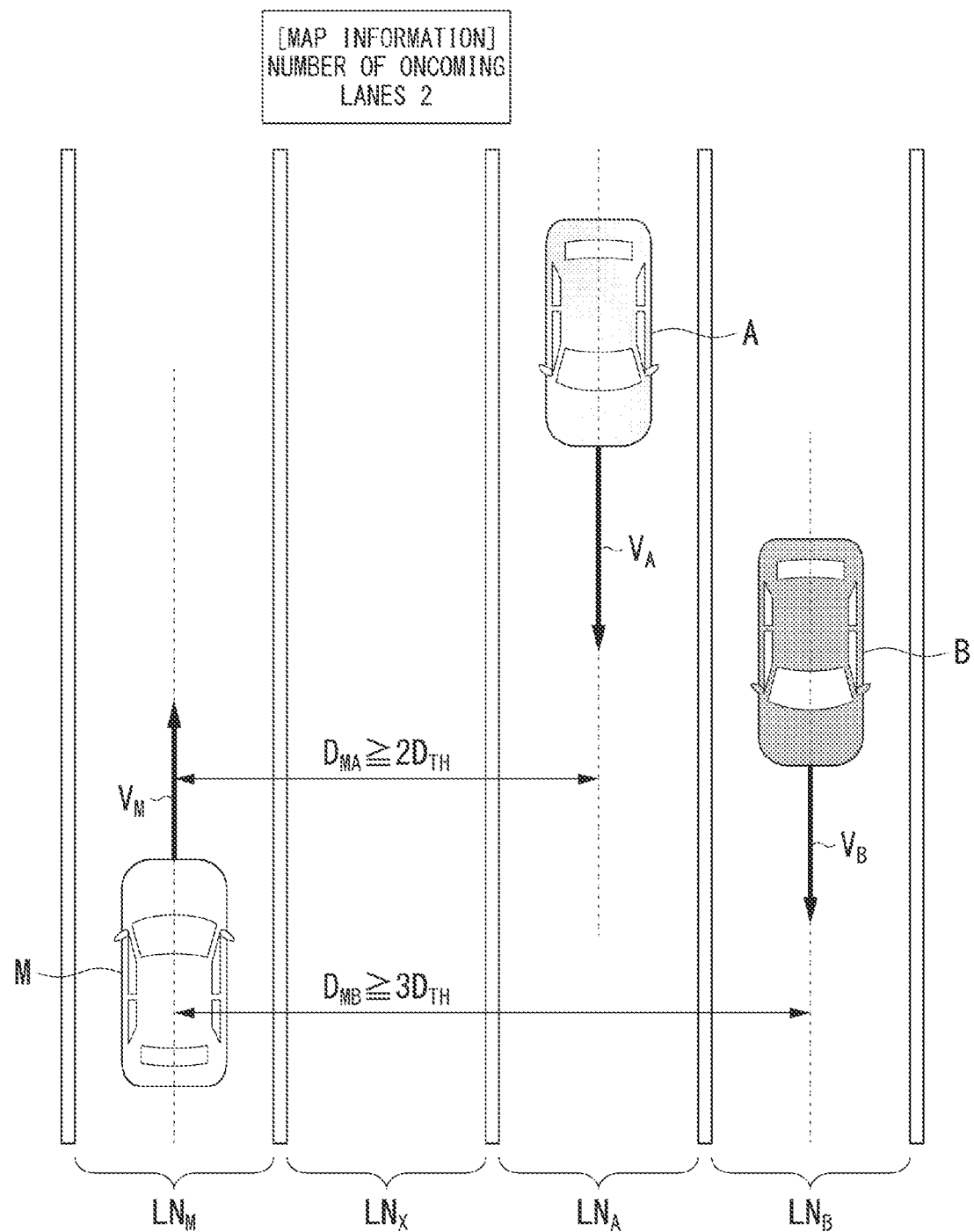
FIG. 7 is a diagram showing still another example of a scene that the own vehicle may encounter.

FIG. 7 is a diagram showing still another example of a scene that the own vehicle M may encounter. In the illustrated scene, there is another vehicle B in addition to the other vehicle A.

In such a scene, the recognizer 130 recognizes that the own lane $LN_M$ is present at the traveling position of the own vehicle M, recognizes that the other lane $LN_A$ is present at the traveling position of the other vehicle A, and recognizes that another lane $LN_B$ is present at the traveling position of the other vehicle B.

Next, the recognizer 130 recognizes an advancing direction of the other lane $LN_A$ on the basis of the relative speed $V_{MA}$ between the own vehicle M and the other vehicle A with respect to the advancing direction of the own vehicle M, and recognizes an advancing direction of the other lane $LN_B$ on the basis of the relative speed $V_{MB}$ between the own vehicle M and the other vehicle B with respect to the advancing direction of the own vehicle M. In the illustrated example, it is determined that the advancing direction of the other lane $LN_A$ is opposite to the advancing direction of the own lane $LN_M$, that is, the other lane $LN_A$ is an oncoming lane, and it is determined that the advancing direction of the other lane $LN_B$ is opposite to the advancing direction of the own lane $LN_M$, that is, the other lane $LN_B$ is also an oncoming lane.

Next, the recognizer 130 recognizes a relative positional relationship between the own lane $LN_M$, the other lane $LN_A$, and the other lane $LN_B$ on the basis of the relative distance $D_{MA}$ between the own vehicle M and the other vehicle A with respect to the vehicle width direction of the own vehicle M, the relative distance $D_{MB}$ between the own vehicle M and the other vehicle B with respect to the vehicle width direction of the own vehicle M, and/or the second map information 62.

As shown in the figure, for example, in a case where the relative distance $D_{MA}$ is twice or more the predetermined width $D_{TH}$ and the relative distance $D_{MB}$ is three times or more the predetermined width $D_{TH}$, the recognizer 130 determines that the own lane $LN_M$ and the other lanes $LN_A$ and $LN_B$ are not adjacent to each other and the other lane $LN_X$ is interposed between the own lane $LN_M$ and the other lane $LN_A$.

In a case where the other lane $LN_X$ is interposed between the own lane $LN_M$ and the other lane $LN_A$, the recognizer 130 further recognizes an advancing direction of the other lane $LN_X$ on the basis of the second map information 62. For example, in a case where the number of lanes N of the oncoming lane included in the second map information 62 is two, the recognizer 130 inevitably determines that the other lane $LN_X$ is the same direction lane. In this case, since the adjacent lane of the own lane $LN_M$ is not an oncoming lane, the control level of driving assistance or automated driving is maintained.

Figure 8:
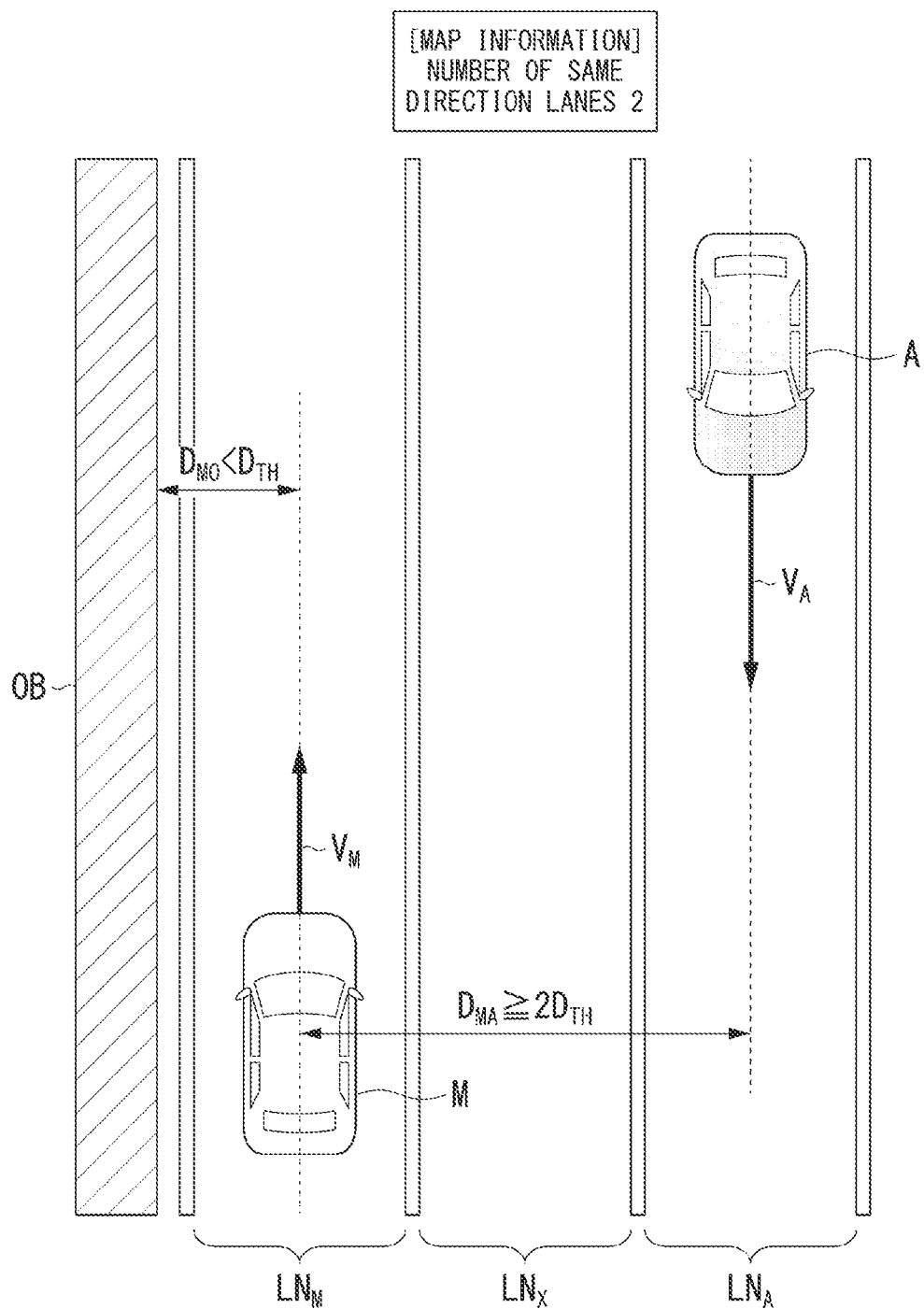
FIG. 8 is a diagram showing still another example of a scene that the own vehicle may encounter.

FIG. 8 is a diagram showing still another example of a scene that the own vehicle M may encounter. In the illustrated scene, another vehicle A is present around the own vehicle M, and an object OB that may be a roadside object is present. The roadside object is a structure installed on the side of a road, such as a noise barrier or a guardrail.

As described above, when the recognizer 130 recognizes that the other vehicle A is present, the recognizer 130 recognizes the speed $V_A$ of the other vehicle A, recognizes the relative speed $V_{MA}$ between the speed $V_M$ of the own vehicle M and the speed $V_A$ of the other vehicle A, or recognizes the relative distance $D_{MA}$ between the own vehicle M and the other vehicle A. The recognizer 130 recognizes that the own lane $LN_M$ is present at the traveling position of the own vehicle M, and recognizes that the other lane $LN_A$ is present at the traveling position of the other vehicle A. The recognizer 130 may recognize the object OB which may be a roadside object by using semantic segmentation or the like, and recognize a relative distance $D_{MO}$ between the own vehicle M and the object OB.

Next, the recognizer 130 recognizes an advancing direction of the other lane $LN_A$ on the basis of the relative speed $V_{MA}$. In the illustrated example, it is determined that the advancing direction of the other lane $LN_A$ is opposite to the advancing direction of the own lane $LN_M$, that is, the other lane $LN_A$ is an oncoming lane.

Next, the recognizer 130 determines whether or not the other lane $LN_X$ is interposed between the own lane $LN_M$ and the other lane $LN_A$ on the basis of the relative distance $D_{MA}$ between the own vehicle M and the other vehicle A. In the illustrated example, since the relative distance $D_{MA}$ is twice or more the predetermined width $D_{TH}$, the recognizer 130 determines that the other lane $LN_X$ is interposed between the own lane $LN_M$ and the other lane $LN_A$.

The recognizer 130 determines whether or not the relative distance $D_{MO}$ between the own vehicle M and the object OB is less than 1 time the predetermined width $D_{TH}$, and if the relative distance $D_{MO}$ is less than 1 time the predetermined width $D_{TH}$, determines that the object OB is a roadside object, and if not, determines that the object OB is another vehicle in an adjacent lane to the left side of the own lane $LN_M$.

In a case where the object OB is present on the opposite side to the other vehicle A when viewed from the own vehicle M and the relative distance $D_{MO}$ is less than 1 time the predetermined width $D_{TH}$, the recognizer 130 recognizes an advancing direction of the other lane $LN_X$ on the basis of the second map information 62. For example, in a case where the number of lanes K of the same direction lanes included in the second map information 62 is two (where K is any natural number), the recognizer 130 determines that the other lane $LN_X$ is the same direction lane. That is, the recognizer 130 determines that the adjacent lane of the own lane $LN_M$ is not an oncoming lane.

In the scene in FIG. 8 described above, in a case where conditions that (i) the relative distance $D_{MA}$ is 1 time or more and less than twice the predetermined width $D_{TH}$ (without the other lane $LN_X$ being interposed), (ii) the advancing direction of the other lane $LN_A$ is the same as the advancing direction of the own lane $LN_M$, that is, the other lane $LN_A$ is the same direction lane, and (iii) the object OB is present on the opposite side to the other vehicle A when viewed from the own vehicle M, and the relative distance $D_{MO}$ is less than 1 time the predetermined width $D_{TH}$, are satisfied, the recognizer 130 may determine that there is no adjacent lane on the right side of the own lane $LN_M$ and the adjacent lane on the left side is the other lane $LN_A$. That is, the recognizer 130 may determine that the adjacent lane of the own lane $LN_M$ is not an oncoming lane.

According to the embodiment described above, the automated driving control device 100 determines whether or not an adjacent lane of an own lane is an oncoming lane on the basis of at least two of a relative distance to another vehicle, a relative speed with the other vehicle, and the second map information 62 including an advancing direction of a lane and the number of lanes, in a case where it is determined that the adjacent lane is the same direction lane, continues driving assistance or automated driving, and in a case where it is determined that the adjacent lane is an oncoming lane, reduces a level of the driving assistance or the automated driving. As described above, by recognizing a relative positional relationship of each lane on the basis of the relative distance, the relative speed, and the second map information 62, driving assistance or automated driving can be continued for a longer period of time even in a situation in which a lane marking cannot be recognized.

In the above embodiment, the predetermined width $D_{TH}$ has been described as being a fixed width (for example, 1.5 m to 3 m), but the present invention is not limited to this. For example, the action plan generator 140 or the mode controller 150 may change the predetermined width $D_{TH}$ according to the type of road. Specifically, the action plan generator 140 or the mode controller 150 may increase the predetermined width $D_{TH}$ in an expressway and reduce the predetermined width $D_{TH}$ in an urban area. By dynamically changing the predetermined width $D_{TH}$ according to the type of road as described above, it is possible to accurately recognize a relative positional relationship between lanes.

[Hardware Configuration]

Figure 9:
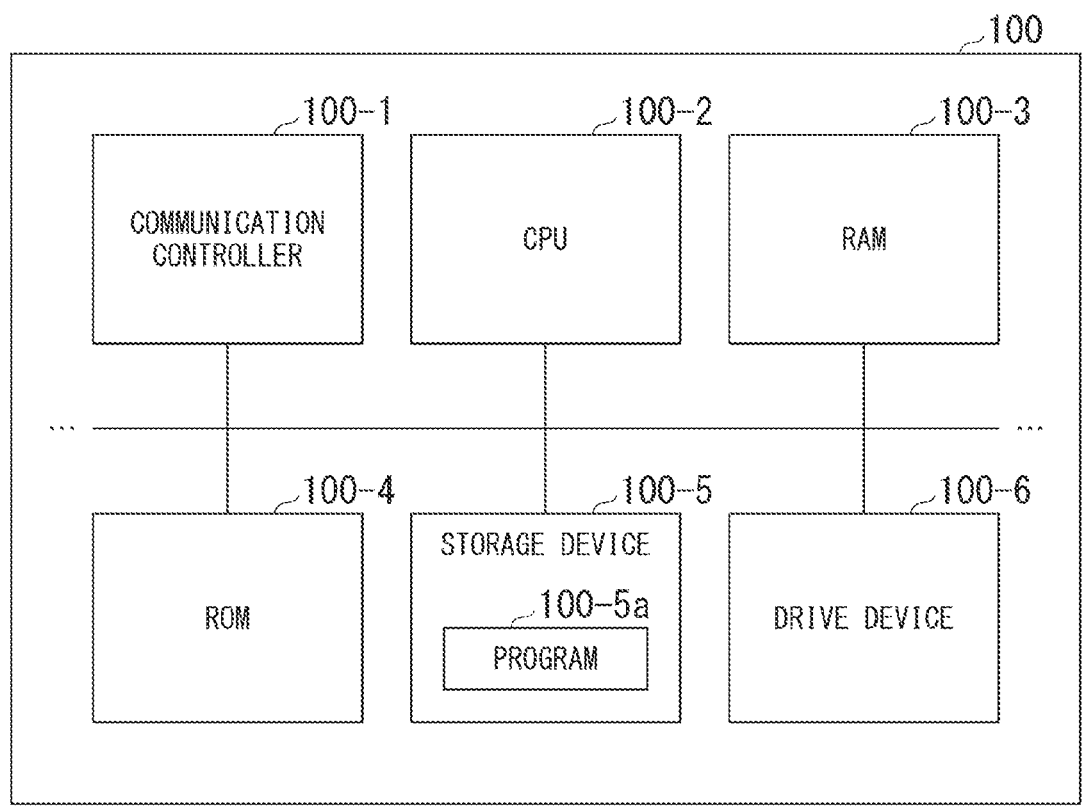
FIG. 9 is a diagram showing an example of a hardware configuration of the automated driving control device of the embodiment.

FIG. 9 is a diagram showing an example of a hardware configuration of the automated driving control device 100 of the embodiment. As shown in FIG. 9, the automated driving control device 100 is configured to include a communication controller 100-1, a CPU 100-2, a RAM 100-3 used as a working memory, a ROM 100-4 storing a boot program or the like, a storage device 100-5 such as a flash memory or an HDD, and a drive device 100-6 that are connected to each other via an internal bus or a dedicated communication line. The communication controller 100-1 performs communication with constituents other than the automated driving control device 100. The storage device 100-5 stores a program 100-5a executed by the CPU 100-2. The program is loaded to the RAM 100-3 by a direct memory access ($D_{MA}$) controller (not shown) or the like and is executed by the CPU 100-2. Consequently, at least one of the first controller 120 and the second controller 160 is realized.

The embodiment described above may be expressed as follows.

A vehicle control device including:

a storage medium storing computer-readable instructions; and a processor connected to the storage medium, in which the processor executes the computer-readable instructions to be configured to recognize a relative speed and a relative distance between another vehicle present in the surroundings of an own vehicle and the own vehicle, perform driving assistance or automated driving for controlling at least one of a speed or steering of the own vehicle on the basis of the recognized relative speed and relative distance, recognize that a first other lane is present at a position of a first other vehicle on the basis of a first relative distance between the own vehicle and the first other vehicle with respect to a vehicle width direction of the own vehicle, recognize an advancing direction of the first other lane on the basis of a first relative speed between the own vehicle and the first other vehicle with respect to an advancing direction of the own vehicle, in a case where the recognized advancing direction of the first other lane is opposite to the advancing direction of the own lane, determine whether or not an adjacent lane of the own lane is an oncoming lane on the basis of at least two of the first relative distance, a second relative speed between the own vehicle and a second other vehicle with respect to the advancing direction of the own vehicle, and map information including an advancing direction of a lane and the number of lanes, and in a case where it is determined that the adjacent lane is not the oncoming lane, continue the driving assistance or the automated driving.

As mentioned above, the mode for carrying out the present invention has been described by using the embodiment, but the present invention is not limited to the embodiment, and various modifications and replacements may occur within the scope without departing from the spirit of the present invention.

What is claimed is:

1. A vehicle control device comprising:

one or more processor configured to:

recognize a relative speed and a relative distance between another vehicle present, in a surroundings of an own vehicle, and the own vehicle; and perform driving assistance or automated driving for controlling at least one of a speed or steering of the own vehicle based on the relative speed and the relative distance, determine that a first other lane is present at a position of a first other vehicle based on a first relative distance between the own vehicle and the first other vehicle with respect to a vehicle width direction of the own vehicle, and determine a first advancing direction associated with the first other lane based on a first relative speed between the own vehicle and the first other vehicle with respect to a second advancing direction associated with the own vehicle, and in a case where the first advancing direction of the first other lane is opposite to the second advancing direction of the own lane, determine whether or not an adjacent lane of the own lane is an oncoming lane based on at least two of the first relative distance, a second relative speed between the own vehicle and a second other vehicle with respect to the second advancing direction of the own vehicle, and map information including a third advancing direction associated with a lane and a number of lanes, and in response to determining that the adjacent lane is not the oncoming lane, continue the driving assistance or the automated driving.

2. The vehicle control device according to claim 1, wherein, in response to determining that the number of lanes of oncoming lanes is N, which is a natural number, the first relative distance is twice or more than a predetermined width, and an N-th relative distance between the own vehicle and an N-th other vehicle with respect to the vehicle width direction of the own vehicle is (N+1) times or more than the predetermined width, the determining that the adjacent lane is not the oncoming lane.

3. The vehicle control device according to claim 2, wherein, in a case where N is 1, and the first relative distance is twice or more than the predetermined width, the one or more processor determines that the adjacent lane is not an oncoming lane.

4. The vehicle control device according to claim 2, wherein the one or more processor is configured to in a case where N is 2 or greater, recognize that an N-th other lane is present at a position of the N-th other vehicle based on the basis of the N-th relative distance, and an N-th advancing direction of the N-th other lane based on an N-th relative speed between the own vehicle and the N-th other vehicle with respect to the second advancing direction of the own vehicle, and wherein, in response to determining that the first relative distance is twice or more than the predetermined width, the N-th advancing direction of the N-th other lane is opposite to the second advancing direction of the own lane, and the N-th relative distance is (N+1) times or more than the predetermined width, the one or more process is configure to determine that the adjacent lane is not the oncoming lane.

5. The vehicle control device according to claim 2,
wherein the one or more processor is configured to recognize a roadside object in the surroundings of the own vehicle, and
wherein, in in response to determining that the number of lanes of a same direction lane as the first advancing direction of the own lane is two or more, the roadside object is present on a side opposite to the first other vehicle when viewed from the own vehicle, and a third relative distance between the own vehicle and the roadside object with respect to the vehicle width direction of the own vehicle is less than 1 time the predetermined width, determine that the adjacent lane is not the oncoming lane.

6. The vehicle control device according to claim 2,
wherein the one or more processor is configured to change the predetermined width according to a type of road.

7. The vehicle control device according to claim 1,
wherein the one or more processor is configured to:
determine that a second other lane is present at a position of the second other vehicle based on a second relative distance between the own vehicle and the second other vehicle with respect to the vehicle width direction of the own vehicle, and
determine that a third advancing direction of the second other lane based on the second relative speed, and
wherein, in in response to determining that the first relative distance is twice or more than the predetermined width, the third advancing direction of the second other lane is identical to the second advancing direction of the own lane, and the second relative distance is 1 time or more than the predetermined width, determine that the adjacent lane is not the oncoming lane.

8. The vehicle control device according to claim 1,
wherein, in response to determining that the adjacent lane is not the oncoming lane, the one or more process is configured to continue the driving assistance or the automated driving on condition that a driver of the own vehicle is touching a steering operator with his/her hand.

9. The vehicle control device according to claim 1,
wherein, in response to determining that the adjacent lane is the oncoming lane, the one or more processor is configured to reduce a level of the driving assistance or the automated driving.

10. A vehicle control method of causing a computer mounted an own vehicle to:
recognize a relative speed and a relative distance between another vehicle present, in a surroundings of the own vehicle, and the own vehicle;
perform driving assistance or automated driving for controlling at least one of a speed or steering of the own vehicle based on the relative speed and the relative distance;
determine that a first other lane is present at a position of a first other vehicle based on the basis of a first relative distance between the own vehicle and the first other vehicle with respect to a vehicle width direction of the own vehicle;
determine that a first advancing direction associated with the first other lane based on a first relative speed between the own vehicle and the first other vehicle with respect to a second advancing direction associated with the own vehicle;
in a case where the first advancing direction of the first other lane is opposite to the second advancing direction of the own lane, determine whether or not an adjacent lane of the own lane is an oncoming lane based on at least two of the first relative distance, a second relative speed between the own vehicle and a second other vehicle with respect to the second advancing direction of the own vehicle, and map information including a third advancing direction associated with a lane and a number of lanes; and
in response to determining that the adjacent lane is not the oncoming lane, continue the driving assistance or the automated driving.

11. A non-transitory storage medium storing computer-readable instructions for causing a computer mounted on an own vehicle to execute:
recognizing a relative speed and a relative distance between another vehicle present, in a surroundings of the own vehicle, and the own vehicle;
performing driving assistance or automated driving for controlling at least one of a speed or steering of the own vehicle based on the relative speed and the relative distance;
determine that a first other lane is present at a position of a first other vehicle based on a first relative distance between the own vehicle and the first other vehicle with respect to a vehicle width direction of the own vehicle;
determining that a first advancing direction associated with the first other lane based on a first relative speed between the own vehicle and the first other vehicle with respect to a second advancing direction associated with the own vehicle;
in a case where the first recognized advancing direction of the first other lane is opposite to the second advancing direction of the own lane, determining whether or not an adjacent lane of the own lane is an oncoming lane based on at least two of the first relative distance, a second relative speed between the own vehicle and a second other vehicle with respect to the second advancing direction of the own vehicle, and map information including a third advancing direction associated with a lane and a number of lanes; and
in response to determining that the adjacent lane is not the oncoming lane, continuing the driving assistance or the automated driving.

* * * * *